(Model.)

G. W. FOSKETT.
MACHINE FOR TURNING ROUND TENONS.

No. 278,118. Patented May 22, 1883.

2 Sheets—Sheet 1.

WITNESSES:

INVENTOR:
G. W. Foskett
BY Munn & Co.
ATTORNEYS.

N. PETERS. Photo-Lithographer, Washington, D. C.

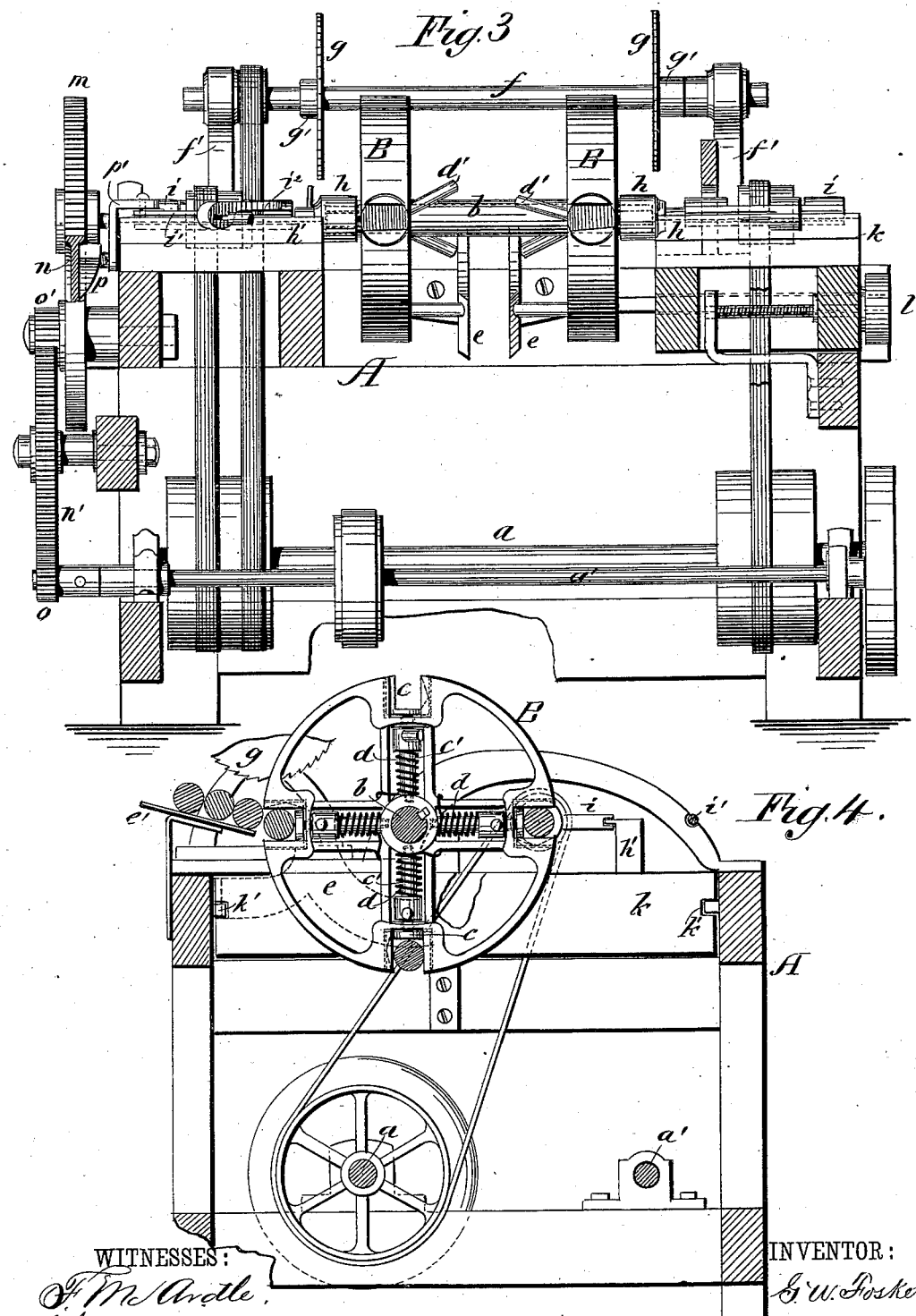

UNITED STATES PATENT OFFICE.

GEORGE W. FOSKETT, OF WINCHENDON, MASSACHUSETTS.

MACHINE FOR TURNING ROUND TENONS.

SPECIFICATION forming part of Letters Patent No. 278,118, dated May 22, 1883.

Application filed February 26, 1883. (Model.)

*To all whom it may concern:*

Be it known that I, GEORGE W. FOSKETT, of Winchendon, in the county of Worcester and State of Massachusetts, have invented a new and Improved Machine for Forming Round Tenons, of which the following is a full, clear, and exact description.

My improvements relate to machines for forming tenons on chair-legs or forming round tenons on other articles; and the invention consists in the combination of rotary clutches for carrying the work to the cutters, revolving chucks carrying the tenoning-cutters, and saws for cutting the legs or other articles to uniform length, together and with mechanism for regulating the length of the tenon and for effecting the successive operations automatically, as hereinafter set forth and claimed.

Reference is to be had to the accompanying drawings, forming part of this specification, in which similar letters of reference indicate corresponding parts in all the figures.

Figure 1:
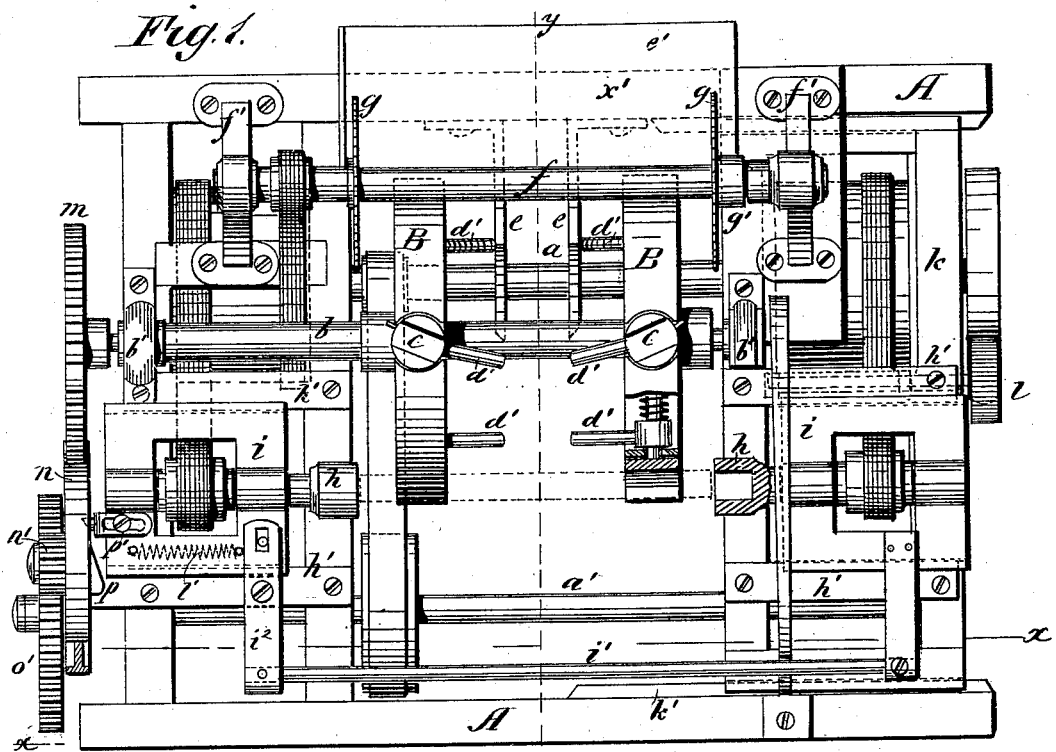
Figure 2:
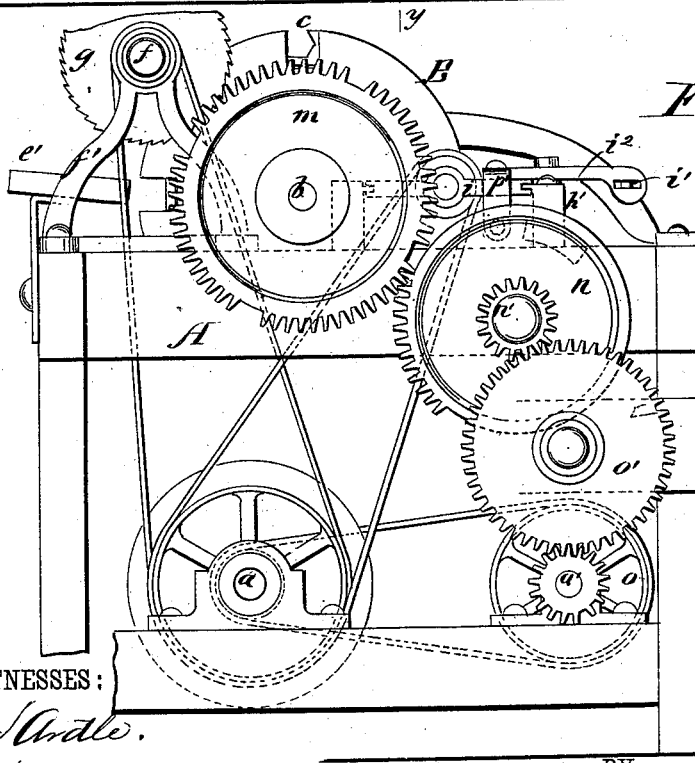

Figure 1 is a plan view of the machine. Fig. 2 is an end elevation of the same. Fig. 3 is a longitudinal section on line $x\ x$ of Fig. 1, and Fig. 4 is a vertical cross-section on line $y\ y$ of Fig. 1.

The operative mechanism is carried by a frame or stand, A, which is provided with a main driving-shaft, $a$, to which power is to be applied, and with a secondary shaft, $a'$, that is connected by belt to the shaft $a$.

Upon the top of the frame, supported by boxes $b'$ at its ends, is a shaft, $b$, carrying two clutch-wheels, B B, that are fitted at regular intervals in their faces with clutches $c$, which, as shown, are four in number. The clutches $c$ are transversely-slotted blocks contained in recesses formed in periphery of the wheels B, and carried by stems $c'$, that extend to the hubs of the wheels, in which they are stepped loosely, so as to allow a turning movement of the clutches. The stems $c'$ carry spiral springs $d$, that tend to turn and retain the clutches with their slots inclined to the axis of the wheels, and thereby cause the clamping of any article in the clutches against the open sides of the recesses containing the clutches.

Upon the stem of each clutch is a projecting pin, $d'$, and attached to frame A are curved plates or segments $e$, placed to strike the pins $d'$, and thereby turn the clutches to their open position and retain them thus for about a quarter of a revolution of the clutch-wheels, or until the clutches reach the lower end of a hopper or table, $e'$, fixed on the frame.

In front of wheels B B, and above the table $e'$, is a shaft, $f$, supported by standards $f'$ and carrying saws $g\ g$, one at the outer side of each wheel B, the saws being attached to collars $g'$, adjustable on the shaft, so that the distance between the saws may be adjusted.

Upon the frame, at the side of shaft $b$ opposite to that on which the hopper is placed, are chucks $h\ h$, carried by shafts sustained on cross-heads $i\ i$, which are fitted in ways $h'$, that permit the chucks to move to and from the sides of the wheels B. The two cross-heads $i$ are connected for simultaneous movement by a lever, $i^2$, and rod $i'$. The ways $h'$, carrying the chuck at one end of the frame A, are sustained on a table or frame, $k$, that is fitted to slide endwise of the main frame on ribs $k'$, and the table is adjustable by a hand-screw, $l$, so that by moving the table the normal distance between the two chucks is varied, according to the length of the articles being operated upon. A spring or springs, $l'$, connected to the cross-heads $i$, act to retain the heads in the outward position. The saw-shaft $f$ and the shafts carrying the chucks $i$ are driven by belts directly from the main shaft $a$. The clutch-wheel shaft $b$ has a gear-wheel, $m$, at one end, engaging a mutilated gear, $n$, mounted on a stud, and the wheel $n$ is rotated from a gear-wheel, $o$, on the secondary shaft $a'$, through the medium of intermediate wheels, $o'\ n'$. The mutilated wheel $n$ is toothed to give the shaft $b$ a quarter-rotation intermittently, and is provided at one side with an inclined lug or projection, $p$, for taking against an arm, $p'$, which is attached by a screw, so as to be adjustable on the cross-head $i$ at that end of the frame, so that at each revolution of wheel $n$, and consequently at each quarter-revolution of shaft $b$, the two slides or heads $i$, with the chucks, will be caused to move inward by action of projection $p$, and then outward by action of the spring. The chucks will carry cutters of suitable character for forming the tenons. Preferably the arm $p'$ will be provided with a friction-roller to take against the cam $p$.

In the operation of the machine the chair-legs or similar articles are placed on the inclined table $e'$, as illustrated in Fig. 4, the lower one lying against the edges of the two wheels B B. As the clutches $c$ reach the table in succession with their slots in line with the table the pause occurs in the movement of the clutch-wheels, the legs roll into the clutches, and the wheels, then moving again the pins $d'$, leave the segments $e$, the clutches turn or close, the ends of the legs are carried against the saws $g$, thereby causing the legs to be cut uniform in length. At the pauses in the rotation of the clutch-wheels the legs are brought in succession in line with the chucks $h$, and as each leg is thus brought into position the inclined projection on the mutilated wheel $n$ moves the chucks inward and upon the ends of the legs, and the cutters form the tenons. The chucks then withdraw, the leg is carried down with the wheels, and, the pins reaching segments $e$, the clutches are opened, and the finished leg drops out. By adjustment of the arm $p'$ on head $i$ to or from the projection $p$ the extent of endwise movement of the chucks is varied and the length of the tenons thus regulated. For long work the table $k$ is to be moved outward by means of screw $l$, and the two cross-heads $i$ thus drawn apart, and by the same means they can be moved inward to suit the length of the legs or other articles being operated upon.

In place of using the gearing for rotating the clutch-wheels, the shaft may carry a disk having equidistant pins on one side and a cam placed for acting on the pins in succession be substituted for the mutilated wheel. I do not limit myself to any special mechanism for communicating the required motions. To reduce friction, the pins on the clutches taking against the segments may be provided with rollers.

Having thus described my invention, what I claim as new, and desire to secure by Letters Patent, is—

1. The combination, with the curved plates $e$, of the rotary wheels B, having transverse slotted blocks $c$ in recesses at regular intervals on their peripheries, stems $c'$, loosely stepped in their hubs, the pins $d'$, and the spiral springs $d$, as and for the purpose described.

2. The combination, with wheels B, carrying clutches, and the curved plates $e$, of the saws $g$ and cutter-carrying chucks $h$, the latter arranged to move to or from the wheels, as described.

3. The combination, with the clutch-wheel shaft $b$, of the gear-wheel $m$, having lug $p$, the mutilated gear-wheel $n$, the gear-wheels $o$ $o'$ $n'$, and the cross-heads $i$, having arm $p'$, as shown and described.

GEORGE W. FOSKETT.

Witnesses:
GEO. M. WHITNEY,
GEO. H. INGALLS.